(12) United States Patent
Tanaka et al.

(10) Patent No.: US 11,430,440 B2
(45) Date of Patent: Aug. 30, 2022

(54) DIALOG DEVICE

(71) Applicant: NTT DOCOMO, INC., Chiyoda-ku (JP)

(72) Inventors: Go Tanaka, Chiyoda-ku (JP); Kousuke Kadono, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 95 days.

(21) Appl. No.: 16/982,907

(22) PCT Filed: Mar. 29, 2019

(86) PCT No.: PCT/JP2019/014115
§ 371 (c)(1),
(2) Date: Sep. 21, 2020

(87) PCT Pub. No.: WO2019/216053
PCT Pub. Date: Nov. 14, 2019

(65) Prior Publication Data
US 2021/0005200 A1    Jan. 7, 2021

(30) Foreign Application Priority Data

May 11, 2018   (JP) .............................. JP2018-092493

(51) Int. Cl.
*G10L 15/00*   (2013.01)
*G10L 15/22*   (2006.01)
(Continued)

(52) U.S. Cl.
CPC .............. *G10L 15/22* (2013.01); *G10L 13/00* (2013.01); *H04L 51/02* (2013.01)

(58) Field of Classification Search
CPC .......... G10L 15/22; G10L 15/32; G06F 3/167
See application file for complete search history.

(56) References Cited

U.S. PATENT DOCUMENTS 6,721,706 B1 * 4/2004 Strubbe .................. G10L 15/18
                                                            704/E15.04
9,576,574 B2 * 2/2017 van Os .................... G10L 15/22
(Continued)

FOREIGN PATENT DOCUMENTS

JP    2003-205483 A   7/2003
JP    2006-72992 A   3/2006
(Continued)

OTHER PUBLICATIONS

Japanese Office Action dated Sep. 21, 2021 in Japanese Patent Application No. 2020-518183 (with unedited computer generated English translation), 6 pages.
(Continued)

*Primary Examiner* — Daniel Abebe
(74) *Attorney, Agent, or Firm* — Oblon, McClelland, Maier & Neustadt, L.L.P.

(57) ABSTRACT

A dialog device according to an embodiment includes an acquisition unit configured to acquire a user utterance input by a user, a plurality of generation units configured to generate a system utterance corresponding to the user utterance, and an output unit configured to output the system utterance generated by one generation unit selected from the plurality of generation units. The plurality of generation units include a first generation unit having a first scenario and a second generation unit having a second scenario different from the first scenario. The output unit outputs a first system utterance generated by the first generation unit in response to the user utterance, in a first expression format, and outputs a second system utterance generated by the second generation unit in response to the user utterance, in a second expression format different from the first expression format, following the first system utterance.

6 Claims, 6 Drawing Sheets

(51) Int. Cl.
  *G10L 13/00* (2006.01)
  *H04L 51/02* (2022.01)

(56) References Cited

U.S. PATENT DOCUMENTS

| | | | |
|---|---|---|---|
| 10,339,166 B1* | 7/2019 | Mois | G06F 16/3329 |
| 2013/0253926 A1* | 9/2013 | Takahashi | G10L 13/00 |
| | | | 704/235 |
| 2016/0179464 A1* | 6/2016 | Reddy | G06F 9/451 |
| | | | 715/728 |
| 2017/0125017 A1* | 5/2017 | Sugiyama | G10L 15/08 |

FOREIGN PATENT DOCUMENTS

| | | |
|---|---|---|
| JP | 2018-32330 A | 3/2018 |
| WO | WO 2015/174172 A1 | 11/2015 |

OTHER PUBLICATIONS

International Preliminary Report on Patentability and Written Opinion dated Nov. 26, 2020 in PCT/JP2019/014115 (submitting English language translation only), 7 pages.
Office Action dated Apr. 12, 2022 in corresponding Japanese Patent Application No. 2020-518183 (with English Translation), 6 pages.

\* cited by examiner

DIALOG DEVICE

TECHNICAL FIELD

An aspect of the present invention relates to a dialog device.

BACKGROUND ART

A mechanism for outputting a natural utterance like a dialog between people is known. For example, Patent Literature 1 describes a speech synthesis device that controls speech synthesis according to a rule for changing a pitch in a specific second section in an answer to speech so that the pitch becomes a pitch having a predetermined relationship with a pitch in a first section and corrects the rule according to at least one of a speaker attribute of a speaker or an agent attribute.

CITATION LIST

Patent Literature

[Patent Literature 1] JP 2015-69138 A

SUMMARY OF INVENTION

Technical Problem

In a dialog between people, there is a scene in which a second person first receives an utterance of a first person and connects to a third person, and the third person responds to the first person (for example, a scene in which a person receives a telephone inquiry and connects to a person in charge). Similar to such a scene, a dialog device capable of artificially expressing a scene in which a plurality of people respond to one utterance is desired.

Solution to Problem

A dialog device according to one aspect of the present invention includes an acquisition unit configured to acquire a user utterance input by a user; a plurality of generation units configured to generate a system utterance corresponding to the user utterance; and an output unit configured to output the system utterance generated by one generation unit selected from the plurality of generation units, wherein the plurality of generation units include a first generation unit having a first scenario and a second generation unit having a second scenario different from the first scenario, and the output unit outputs a first system utterance generated by the first generation unit in response to the user utterance, in a first expression format, and outputs a second system utterance generated by the second generation unit in response to the user utterance, in a second expression format different from the first expression format, following the first system utterance.

In such an aspect, two types of system utterances of the first and second agents (generation units) having different scenarios are output for one user utterance in different expression formats. With this user interface, since a scene in which a plurality of agents with different characters continuously talk with the user is provided to the user, it is possible to artificially express a scene in which a plurality of people respond to one utterance.

Advantageous Effects of Invention

According to one aspect of the present invention, it is possible to artificially express a scene in which a plurality of people respond to one utterance using a dialog device.

DESCRIPTION OF EMBODIMENTS

Hereinafter, embodiments of the present invention will be described in detail with reference to the accompanying drawings. In the description of the drawings, the same or equivalent elements are denoted by the same reference numerals, and redundant description thereof will be omitted.

A dialog device is a computer that executes an automatic dialog with a user. A user is a person who uses a dialog device. The automatic dialog is an exchange of dialog between the user and the computer (this computer is generally referred to as a "bot"). In this automatic dialog, the computer automatically utters in response to an utterance from the user. An utterance is one unit of speech spoken by the user or the computer. Hereinafter, an utterance of the user is also referred to as a "user utterance", and an utterance of the computer is also referred to as a "system utterance".

Applications of the dialog device are not limited. For example, the dialog device may be used in a frequently asked questions (FAQ) system that answers questions of a user or may be used in a chat system that performs arbitrary talking that is not limited to FAQs. Alternatively, the dialog device may be incorporated in a virtual assistant function for executing arbitrary tasks on the basis of a voice operation.

Figure 1:
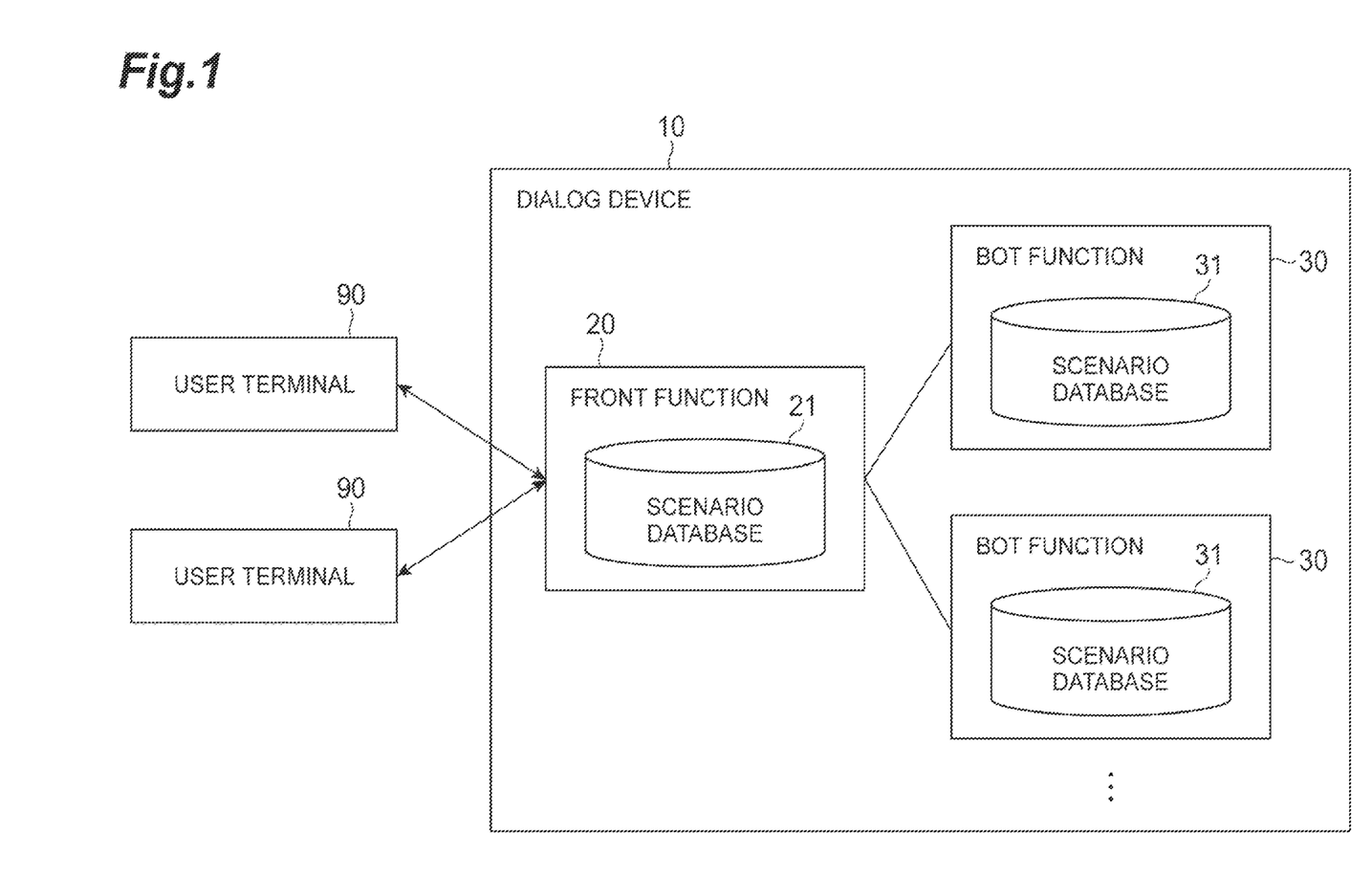
FIG. 1 is a diagram illustrating an example of a functional configuration of a dialog device according to an embodiment.
Figure 2:
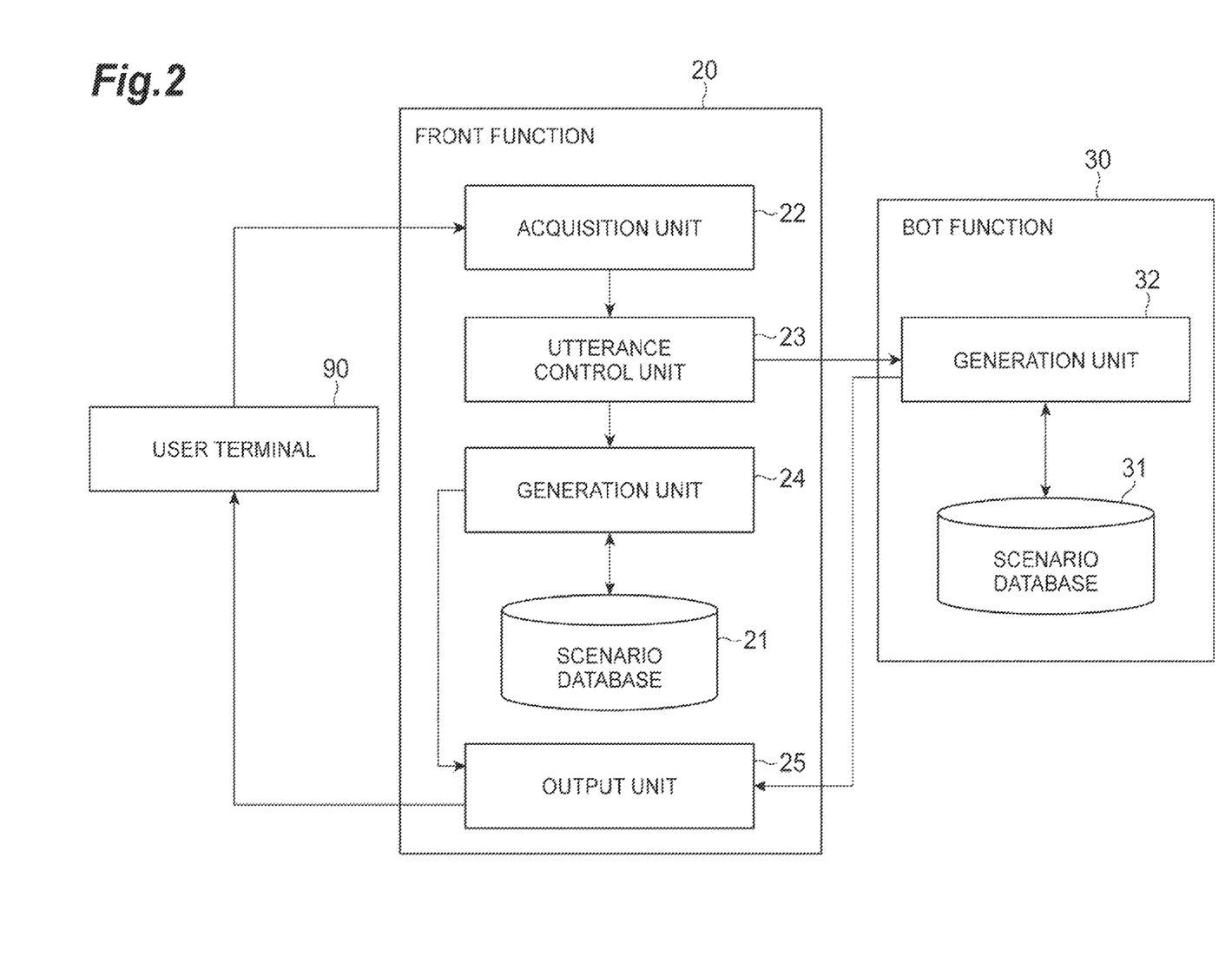
FIG. 2 is a diagram illustrating an example of a detailed functional configuration of the dialog device according to the embodiment.

The dialog device may be a part of a client-server type system or may be a single device. In the embodiment, it is assumed that the dialog device is a computer that functions as a server. FIG. 1 is a diagram illustrating an example of a functional configuration of the dialog device 10 according to the embodiment. FIG. 2 is a diagram illustrating an example of a more detailed functional configuration of the dialog device 10. The dialog device 10 can be connected to at least one user terminal 90 via a communication network. A configuration of the communication network is not limited at all and may be configured using, for example, at least one of the Internet and an intranet.

The user terminal 90 is a computer (a client terminal) that is operated by a user. The user terminal 90 has a function of transmitting an utterance (user utterance) input by the user to the dialog device 10 and a function of outputting an utterance (system utterance) received from the dialog device 10. A type of the user terminal 90 is not limited, and may be, for example, a stationary computer or device or may be a portable computer or device. Specific examples of the user terminal 90 include, but are not limited to, a smartphone, a tablet terminal, a wearable terminal, a personal computer, a smart speaker, a smart TV, and a smart home appliance.

When the dialog device 10 receives the user utterance from the user terminal 90, the dialog device 10 generates the system utterance corresponding to the user utterance on the basis of the scenario and transmits the generated system utterance to the user terminal 90. The scenario is data defining rules for a dialog (rules defining what kind of system utterance is output according to which kind of user utterance is received). One of features of the dialog device 10 is that a plurality of system utterances are continuously output for a certain user utterance as if a plurality of agents having different characters continuously talk with the user. Hereinafter, particularly, the features will be described in detail.

As illustrated in FIG. 1, the dialog device 10 includes, as functional elements, a front function 20 for comprehensively controlling automatic dialog, and one or more bot functions 30 for outputting system utterances regarding a specific topic.

The front function 20 generates the system utterance corresponding to the user utterance received from the user terminal 90 on the basis of a scenario in a scenario database 21 and transmits the generated system utterance to the user terminal 90. The system utterance transmitted to the user terminal 90 in this step corresponds to a first system utterance. Further, the front function 20 determines the bot function 30 for processing the user utterance and outputs information based on the user utterance to the bot function 30. Thereafter, the front function 20 transmits the system utterance generated using the bot function 30 to the user terminal 90 as a second system utterance.

Each bot function 30 generates a system utterance corresponding to information (information based on the user utterance) received from the front function 20 on the basis of scenarios in a scenario database 31 and outputs the generated system utterance to the front function 20. This system utterance also corresponds to the user utterance.

The first system utterance is a system utterance (response) that is output first for any one user utterance, and the second system utterance is a system utterance (response) that is output second for the user utterance. The present embodiment particularly shows an example in which the front function 20 generates the first system utterance and the bot function 30 generates the second system utterance. However, a function in the dialog device 10 that generates the first and second system utterances is not limited. For example, one bot function 30 may generate the first system utterance and the other bot function 30 may generate the second system utterance. Alternatively, the bot function 30 may generate the first system utterance and the front function 20 may generate the second system utterance. In any case, the dialog device 10 outputs the first system utterance for a certain user utterance, and then outputs the second system utterance without acquiring another user utterance.

It can be said that each bot function 30 is an expert agent having specific knowledge, and the front function 20 is a main agent that generally controls one or more bot functions 30. In the embodiment, the dialog device 10 first outputs the first system utterance generated by the front function 20 for one user utterance, and then outputs the second system utterance generated by the bot function 30. As described above, no new user utterance is generated between the first system utterance and the second system utterance. Therefore, from a perspective of the user, this mechanism is such that a first character first receives an utterance of the user, relays the utterance to a second character, and the second character finally answers the utterance. This is similar to, for example, the scene in which a person receives a telephone inquiry and connects to a person in charge.

As illustrated in FIG. 2, the front function 20 includes the scenario database 21, an acquisition unit 22, an utterance control unit 23, a generation unit 24, and an output unit 25. The scenario database 21 is a database that stores a plurality of scenarios regarding a specific topic, and stores, for example, a scenario for a relay to another bot function 30. The acquisition unit 22 is a functional element that acquires a data signal such as a user utterance from the user terminal 90. The utterance control unit 23 is a functional element that determines how to process the user utterance. The generation unit 24 is a functional element that refers to the scenario database 21 and generates the system utterance corresponding to the user utterance. The output unit 25 is a functional element that outputs the system utterance generated by the front function 20 or the bot function 30.

As illustrated in FIG. 2, each bot function 30 includes the scenario database 31 and a generation unit 32. The scenario database 31 is a database that stores a plurality of scenarios regarding a specific topic, and stores, for example, a scenario for outputting a more specialized response than the front function 20. The generation unit 32 is a functional element that refers to the scenario database 31, generates the system utterance corresponding to the user utterance and outputs the system utterance to the front function 20.

The scenario stored in the scenario database 31 is different from the scenario stored in the scenario database 21 of the front function 20. One of the two types of scenarios corresponds to a first scenario and the other corresponds to a second scenario. This configuration means that one of the generation unit 24 and the generation unit 32 corresponds to a first generation unit having the first scenario, and the other corresponds to a second generation unit having the second scenario.

Figure 3:
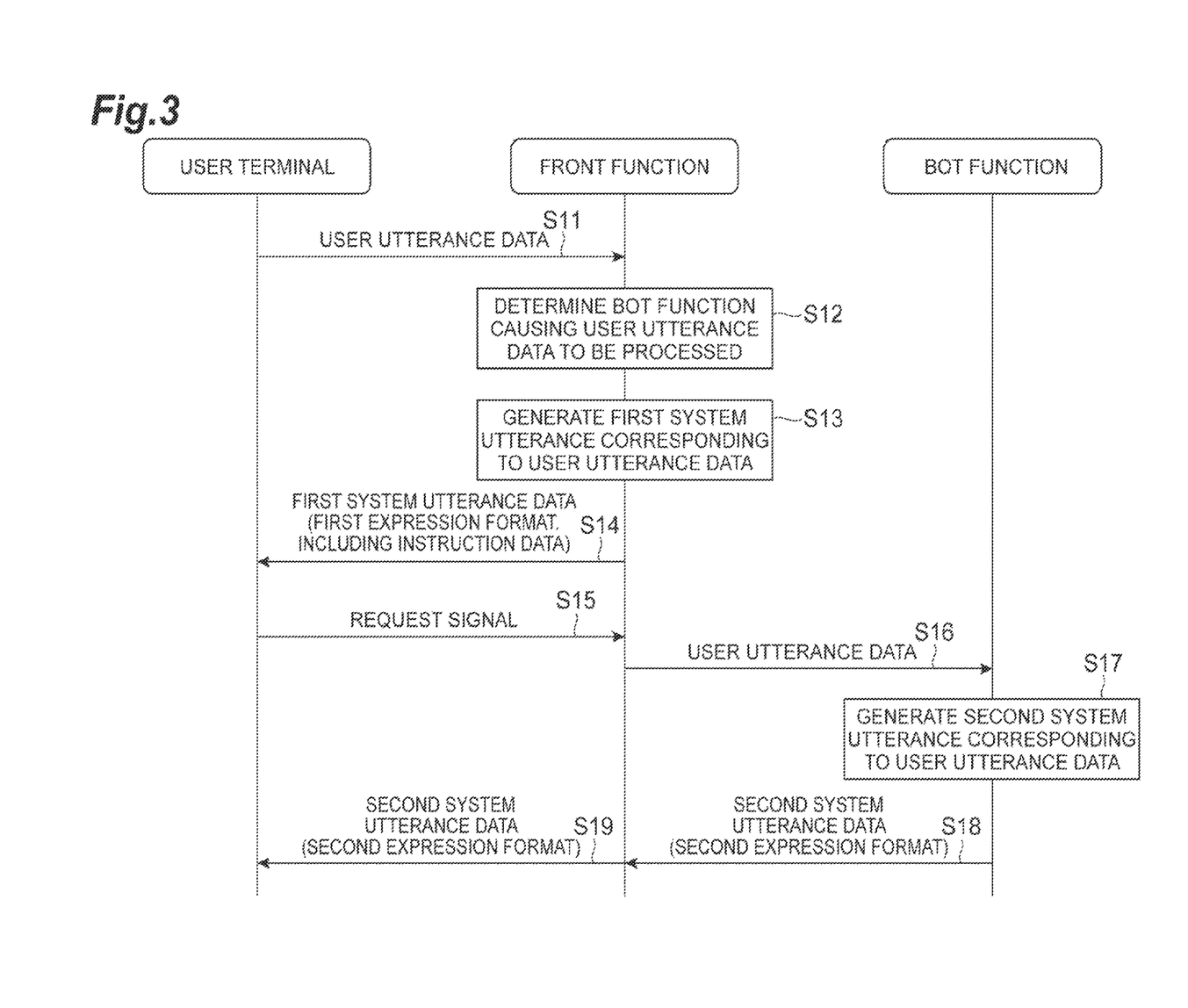
FIG. 3 is a sequence diagram illustrating an example of an operation of the dialog device according to the embodiment.
Figure 4:
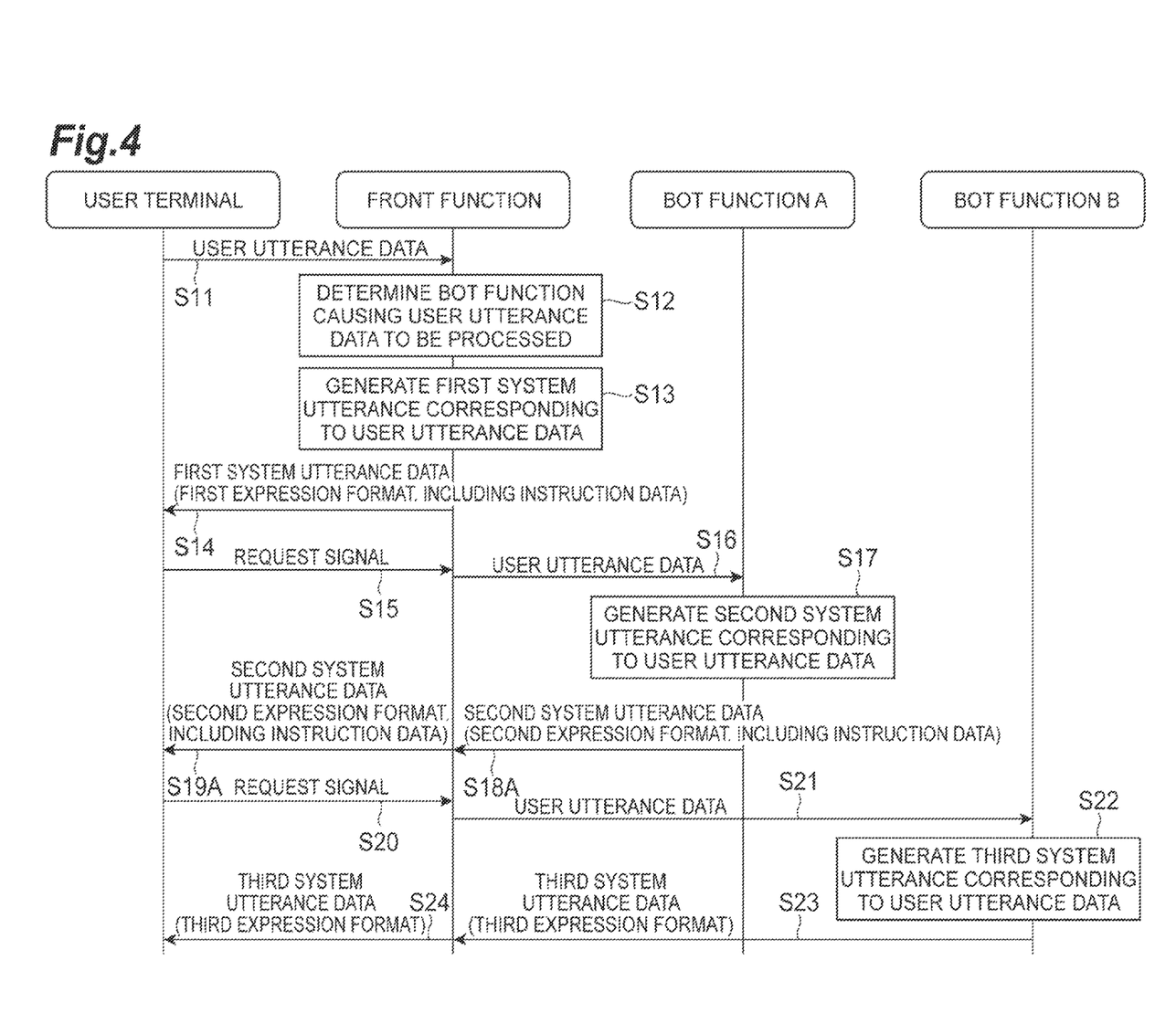
FIG. 4 is a sequence diagram illustrating another example of the operation of the dialog device according to the embodiment.

An operation of the dialog device 10 when an automatic dialog is executed with the user terminal 90 will be described with reference to FIGS. 3 and 4. FIG. 3 is a sequence diagram illustrating an example of an operation of the dialog device 10. FIG. 4 is a sequence diagram illustrating another example of the operation of the dialog device 10. For ease of understanding, FIGS. 3 and 4 illustrate the front function 20 and the bot function 30 of the dialog device 10, respectively, and illustrate only the bot function 30 that processes the user utterance.

In step S11, the user terminal 90 transmits user utterance data to the dialog device 10. In the dialog device 10, the front function 20 receives the user utterance data. The user utterance data is data including at least a user utterance. The user utterance data may include other data items such as an utterance attribute.

A method for acquiring a user utterance in the user terminal 90 is not limited. For example, the user terminal 90 may acquire a user utterance input by voice (that is, a user utterance represented by voice data), or may acquire a user utterance input by a character string (that is, a user utterance represented by text data). Alternatively, the user terminal 90 may automatically generate the user utterance in the form of voice data or text data on the basis of a user instruction.

The utterance attributes are information indicating a nature or feature relevant to the user utterance and can be used in an automatic dialog. For example, the utterance attributes may be used to determine a system utterance.

Specific content of the utterance attributes is not limited. For example, the utterance attributes may include user attributes indicating a nature or feature of a user who wants to use the automatic dialog and terminal attributes indicating a nature or feature of the user terminal 90. The type and number of data items indicating the user attributes are not limited at all. For example, the user attributes may be one selected from a name, a sex, an age, and an address, or may be a combination of two or more items arbitrarily selected from the four items. Alternatively, the user attributes may include one or more other data items different from the four items. The type and number of data items indicating the terminal attributes are not limited at all. For example, the terminal attributes may be one selected from a terminal name, an operating system name, and an operation mode, or may be a combination of two or more items arbitrarily selected from the three items. Alternatively, the terminal attributes may include one or more other data items different from the three items.

In step S12, the utterance control unit 23 determines the bot function 30 that causes the user utterance data to be processed. For example, the utterance control unit 23 determines which bot function 30 is caused to process the user utterance data on the basis of at least one of the user utterance and the utterance attribute included in the user utterance data, and a preset rule.

In step S13, the generation unit 24 generates the first system utterance corresponding to the user utterance data. The generation unit 24 selects a scenario corresponding to the user utterance by searching the scenario database 21 using the user utterance data and generates the system utterance defined in the scenario as the first system utterance. The first system utterance generated herein may be expressed in, for example, a phrase that is often used for a relay. Examples of such expressions include "Connect to Traffic Guidance" and "Please wait for a while to connect to the assistant."

In step S14, the output unit 25 transmits first system utterance data including the first system utterance to the user terminal 90. The first system utterance data includes an expression format of the first system utterance in the user terminal 90 as a first expression format. The expression format is a method for expressing the system utterance in a manner that can be perceived by a person. A type and a specific realization method of the expression format are not limited. For example, the expression format may be defined by an auditory expression that is an expression that can be ascertained by hearing of a person, may be defined by a visual expression that is an expression that can be ascertained by vision of the person, or may be defined by both the auditory expression and the visual expression. A specific method for the auditory expression and the visual expression is not limited. For example, the auditory expression may include at least one selected from a voice and a sound effect. The visual expression may include at least one selected from speech balloons, fonts, text decorations, screen colors, icons, characters, and chat rooms.

The first expression format may be defined using any scheme in the front function 20. For example, the first expression format may be defined by any of metadata, a setting file, and a program (algorithm), or may be defined in a combination of any two or more schemes selected from these schemes. The first expression format may be set by the output unit 25 or the generation unit 24 or may be set by another component of the front function 20.

Thus, a specific method and a realization method for the first expression format are not limited. In any case, the output unit 25 transmits the first system utterance data including the first system utterance and the first expression format to the user terminal 90. That is, the output unit 25 outputs the first system utterance in the first expression format.

In the embodiment, the first system utterance data further includes instruction data. The instruction data is data for causing the user terminal 90 to transmit a request signal for acquiring the second system utterance. The instruction data may be generated, for example, in a metadata format or may be defined using another scheme. In the embodiment, the output unit 25 transmits the instruction data to the user terminal 90 together with the first system utterance, but a method of transmitting the instruction data is not limited thereto. For example, the output unit 25 may transmit the instruction data to the user terminal 90 independently of the first system utterance. For example, the output unit 25 may transmit the instruction data after transmitting the first system utterance data.

When the user terminal 90 receives the first system utterance data, the user terminal 90 outputs the first system utterance in the first expression format. This allows the user to recognize a first reply to the user utterance (for example, a system utterance indicating a relay).

In step S15, the user terminal 90 transmits a request signal to the dialog device 10 in response to the instruction data included in the first system utterance data. This request signal is a data signal for obtaining the second system utterance following the first system utterance. In the dialog device 10, the acquisition unit 22 receives the request signal.

In step S16, the utterance control unit 23 outputs user utterance data to the corresponding bot function 30 in response to the request signal. The user utterance data relayed from the front function 20 to the bot function 30 includes information based on the user utterance and may further include an utterance attribute. The information based on the user utterance may be the user utterance itself received from the user terminal 90. Therefore, the utterance control unit 23 may transfer the user utterance data received in step S11 to the bot function 30. Alternatively, the information based on the user utterance may be another piece of data (for example, another text) that is generated on the basis of the user utterance received from the user terminal 90. For example, the utterance control unit 23 may generate an initialization text (for example, a text "#init") corresponding to the received user utterance, and output the user utterance data including that text to the bot function 30. Alternatively, the utterance control unit 23 may output user utterance data including another text generated by modifying the received user utterance to the bot function 30.

In step S17, the generation unit 32 generates the second system utterance corresponding to the user utterance data. This means that the generation unit 32 generates the second system utterance in response to the reception of the request signal. The generation unit 32 selects the scenario corresponding to the user utterance by searching the scenario database 31 using the user utterance data and generates a system utterance defined in the scenario as the second system utterance. As described above, content of the user utterance data that the bot function 30 acquires from the front function 20 is not limited. In any case, the generation unit 32 generates the second system utterance according to the user utterance received from the user terminal 90.

In step S18, the bot function 30 outputs second system utterance data including the second system utterance to the front function 20. The second system utterance data further includes an expression format of the second system utterance at the user terminal 90 as a second expression format.

A specific scheme for the second expression format is not limited and may be any visual expression or any auditory expression or may be a combination of the visual expression and the auditory expression, similar to the first expression format. However, the second expression format is different from the first expression format. The second expression format may be defined using any scheme (metadata, setting file, program, or the like) in the bot function 30, similar to the first expression format. The second expression format may be set by the generation unit 32 or may be set by another component of the bot function 30.

In step S19, the output unit 25 of the front function 20 transmits the second system utterance data to the user terminal 90. Therefore, the output unit 25 outputs the second system utterance in the second expression format following the first system utterance, without another user utterance being acquired in the dialog device 10 after the user utterance has been acquired in step S11. When the user terminal 90 receives the second system utterance data, the user terminal 90 outputs the second system utterance in the second expression format. This allows the user to recognize a further reply to the user utterance (for example, a direct answer to the user utterance).

A series of processes of steps S11 to S19 can be executed again. For example, when a user utterance in which a topic (scenario) is changed is received, the dialog device 10 may execute the series of processes to relay the user utterance to a different bot function 30.

An example of FIG. 3 shows a process in which the front function 20 relays the user utterance to the bot function 30. In addition to, or as an alternative to this relay, a certain bot function may relay the user utterance for another bot function. An example of the relay between the bot functions 30 will be described with reference to FIG. 4. In this description, the two bot functions 30 are distinguished as bot functions A and B.

Processes in steps S11 to S17 are the same as those in the example of FIG. 3. Subsequent to step S17, the bot function A outputs the second system utterance data including the second system utterance, the second expression format, and the instruction data to the front function 20 in step S18A. The instruction data included in the second system utterance data is data for causing the user terminal 90 to transmit a request signal for acquiring the third system utterance that is generated by the bot function B.

In step S19A, the output unit 25 outputs the second system utterance data to the user terminal 90. When the user terminal 90 receives the second system utterance data, the user terminal 90 outputs the second system utterance in the second expression format. This allows the user to recognize a further reply to the user utterance (for example, a direct answer to the user utterance or a system utterance indicating a further relay).

In step S20, the user terminal 90 transmits a request signal to the dialog device 10 in response to the instruction data included in the second system utterance data. This request signal is a data signal for obtaining the third system utterance following the second system utterance. In the dialog device 10, the acquisition unit 22 receives the request signal.

In step S21, the utterance control unit 23 outputs the user utterance data to the corresponding bot function B in response to the request signal. Content of the user utterance data is not limited, as in step S16. Therefore, the user utterance data may include the user utterance itself received from the user terminal 90 or may include other data (for example, another text) generated on the basis of the user utterance.

In step S22, the bot function B generates a third system utterance corresponding to the user utterance data. This means that the generation unit 32 generates the third system utterance in response to the reception of the request signal in step S20. The generation unit 32 selects the scenario corresponding to the user utterance by searching the scenario database 31 using the user utterance data and generates a system utterance defined in the scenario as the third system utterance. As described above, content of the user utterance data that the bot function B acquires from the front function 20 is not limited. In any case, the generation unit 32 of the bot function B generates the third system utterance according to the user utterance received from the user terminal 90.

In step S23, the bot function 30 of the bot function B outputs third system utterance data including the third system utterance to the front function 20. The third system utterance data further includes an expression format of the third system utterance at the user terminal 90 as a third expression format. A specific scheme of the third expression format is not limited, similarly to the first and second expressions. However, the third expression format is different from both the first expression format and the second expression format.

In step S24, the output unit 25 of the front function 20 transmits the third system utterance data to the user terminal 90. Therefore, the output unit 25 outputs the third system utterance in the third expression format in response to the reception of the request signal, without another user utterance received in the dialog device 10 after the user utterance has been acquired in step S11. When the user terminal 90 receives the third system utterance data, the user terminal 90 outputs the third system utterance in the third expression format. This allows the user to recognize a further reply to the user utterance (for example, a direct answer to the user utterance).

As described above, a function in the dialog device 10 that generates the first and second system utterances is not limited. Therefore, for example, the bot function A may generate the first system utterance that is output in the first expression format, and the bot function B may generate the second system utterance that is output in the second expression format. Alternatively, the bot function 30 may generate the first system utterance and the front function 20 may generate the second system utterance. It should be noted that FIGS. 3 and 4 illustrate only examples of the process of the dialog device 10.

The dialog device 10 transmits the instruction data to the user terminal 90 with the transmission of the first system utterance to cause the user terminal 90 to transmit the request signal, and transmits the second system utterance to the user terminal 90 in response to the request signal. This mechanism can be said as a type of postback that is a mechanism for retransmitting data input at a client terminal to the same program rather than another program.

Since the second expression format is different from the first expression format, the user can experience a situation in which a first character utters the first system utterance and a second character different from the first character utters the second system utterance. As described above, since the specific scheme for the expression format is not limited, the dialog device 10 can switch between the expressions of system utterance using various schemes. For example, the first expression format may be a female voice and the second expression format may be a male voice. Alternatively, the first expression format may be a male voice with a certain voice quality (for example, an adult voice), and the second expression format may be a male voice with a different voice quality (for example, a child voice). Alternatively, the first expression format may be an elliptical speech balloon and the second expression format may be a rectangular speech balloon. Alternatively, the first expression format may be a certain character having a certain voice quality, and the second expression format may be a different character having a different voice quality. Thus, the second expression format may be the same type as the first expression format but a different expression format.

Figure 5:
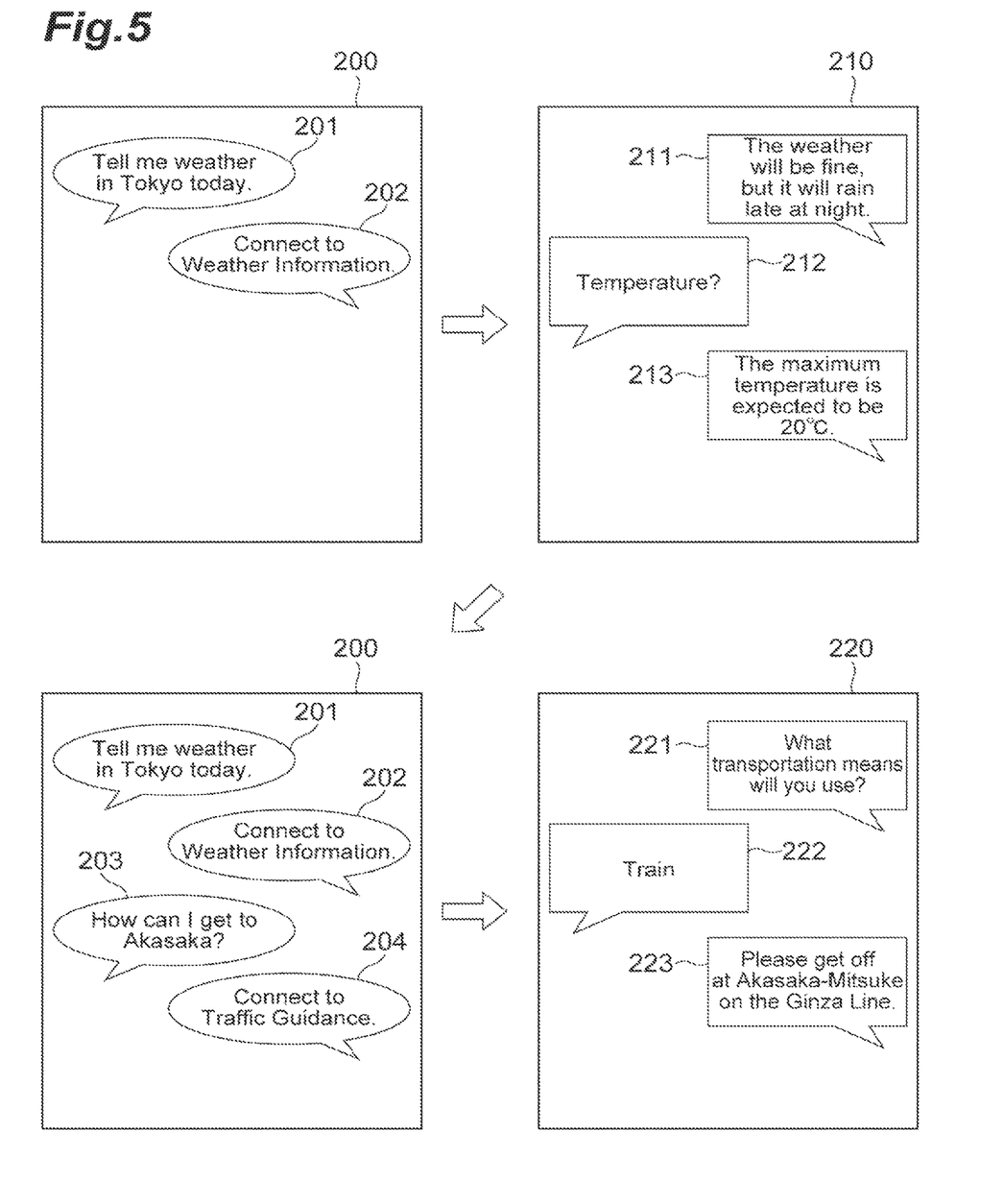
FIG. 5 is a diagram illustrating an example of an automatic dialog with switching between chat rooms.

Another example of the expression of the system utterance will be described with reference to FIG. 5. FIG. 5 is a diagram illustrating an example in which the system utterance is expressed by a chat room. The chat room is an expression method that visually shows a dialog history between a user and one bot. For example, when the user inputs "Tell me weather in Tokyo today," the user terminal 90 displays the user utterance in a chat room 200 with a speech balloon 201 and transmits the user utterance to the dialog device 10. The dialog device 10 responds to the user utterance and transmits a system utterance "Connect to Weather Information" to the user terminal 90. This system utterance is the first system utterance generated by the generation unit 24 of the front function 20. The user terminal 90 displays the first system utterance in the chat room 200 with a speech balloon 202. The chat room 200 is a user interface corresponding to the front function 20 (the generation unit 24).

Following the first system utterance, the bot function 30 that processes the user utterance transmits the system utterance "The weather will be fine, but it will rain late at night" to the user terminal 90. This system utterance is a second system utterance that is generated by the generation unit 32 of the bot function 30. The user terminal 90 switches a screen from the chat room 200 to a chat room 210 in response to the second system utterance data and displays the second system utterance in the chat room 210 with a speech balloon 211. The chat room 210 is a user interface corresponding to the bot function 30 (the generation unit 32). When the user inputs "Temperature?" in response to the second system utterance, the user terminal 90 displays the user utterance in the chat room 210 with a speech balloon 212 and transmits the user utterance to the dialog device 10. The dialog device 10 responds to the user utterance and transmits a system utterance "The maximum temperature is expected to be 20° C." to the user terminal 90. Since this system utterance is a system utterance that is generated by the generation unit 32 of the bot function 30, the user terminal 90 displays the system utterance in the chat room 210 with a speech balloon 213.

When the user inputs "How can I get to Akasaka?" following the system utterance, the user terminal 90 transmits the user utterance to the dialog device 10. The dialog device 10 responds to the user utterance and transmits a system utterance "Connect to Traffic Guidance" to the user terminal 90. This system utterance is the first system utterance generated by the generation unit 24 of the front function 20. The user terminal 90 switches the screen from the chat room 210 to the chat room 200, displays the user utterance with a speech balloon 203, and displays the first system utterance with a speech balloon 204.

Following the first system utterance, the bot function 30 that processes the user utterance transmits a system utterance "What transportation means will you use?" to the user terminal 90. This system utterance is a second system utterance that is generated by the generation unit 32 of another bot function 30. The user terminal 90 switches the screen from the chat room 200 to a chat room 220 and displays the second system utterance in the chat room 220 with a speech balloon 221. The chat room 220 is a user interface corresponding to the other bot function 30 (the generation unit 32). When the user inputs "Train" in response to the second system utterance, the user terminal 90 displays the user utterance in the chat room 220 with a speech balloon 222 and transmits the utterance to the dialog device 10. The dialog device 10 transmits a system utterance "Please get off at Akasaka-Mitsuke on the Ginza Line" to the user terminal 90 in response to the user utterance. Since this system utterance is a system utterance that is generated by the generation unit 32 of the other bot function 30, the user terminal 90 displays the system utterance in the chat room 220 with a speech balloon 223. Thus, one chat room may indicate a history of a dialog between the user and one agent. This means that a dialog indicated by one chat room corresponding to one generation unit is limited to one or more user utterances, and one or more system utterances that are generated by that generation unit.

In the example of FIG. 5, a shape of the speech balloon in the chat room 200 is different from those of the chat rooms 210 and 220, but the shape of the speech balloon may be unified between the chat rooms. Alternatively, the shape of the speech balloon may be different in each chat room. Alternatively, other visual expressions such as fonts and screen colors may be different among the chat rooms 200, 210, and 220.

The block diagram used for the description of the above embodiment illustrates blocks in units of functions. Functional blocks (constituent elements) thereof are realized by an arbitrary combination of hardware and/or software. Further, a means for realizing each functional block is not particularly limited. That is, each functional block may be realized by one physically and/or logically coupled device or may be realized by a plurality of devices in which two or more physically and/or logically separated devices may be connected directly and/or indirectly (for example, by a cable and/or wirelessly).

Figure 6:
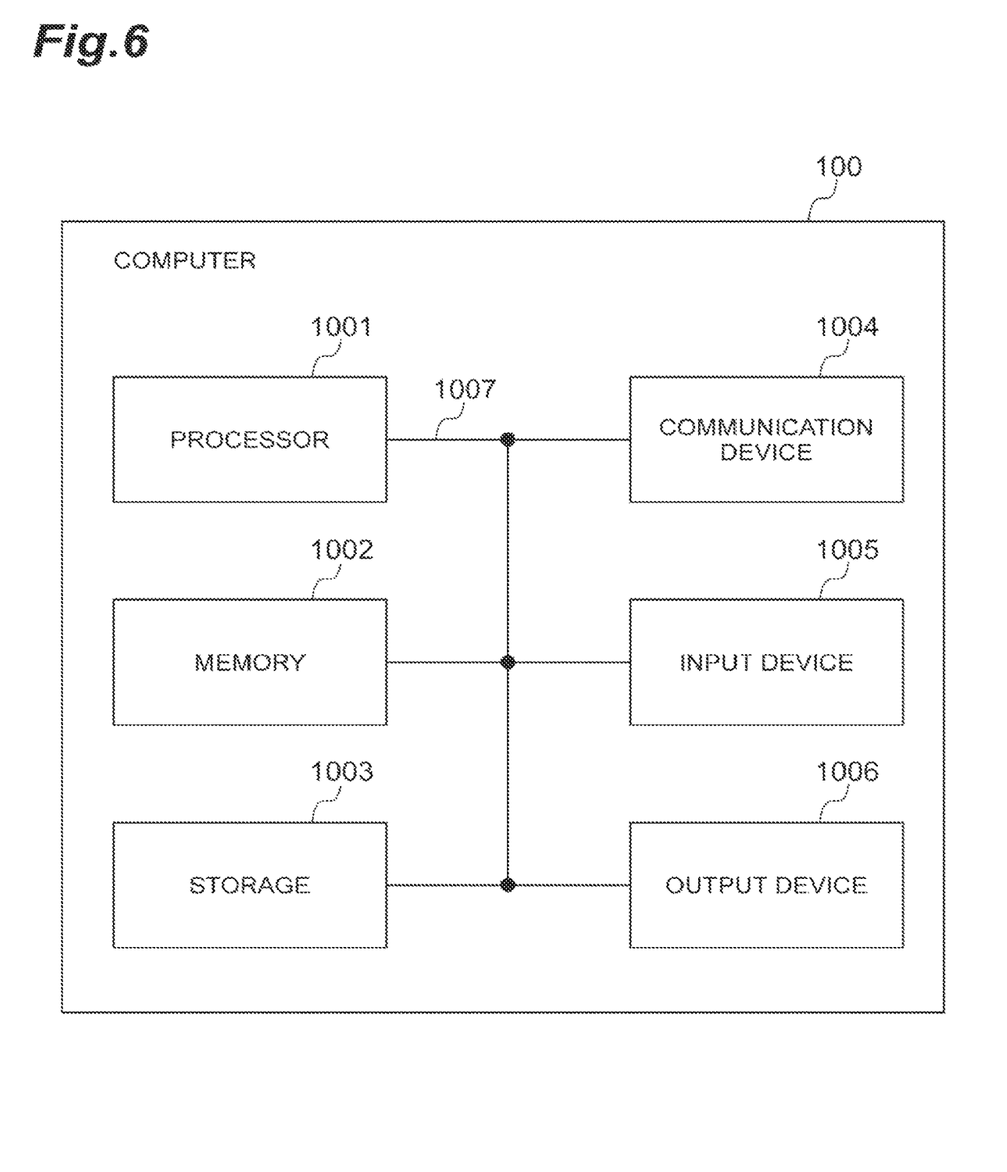
FIG. 6 is a diagram illustrating an example of a hardware configuration of a computer that is used in the dialog device according to the embodiment.

For example, the dialog device 10 according to an embodiment of the present invention may function as a computer that performs the process according to the embodiment. FIG. 6 is a diagram illustrating an example of a hardware configuration of a computer 100 functioning as the dialog device 10. The computer 100 may physically include a processor 1001, a memory 1002, a storage 1003, a communication device 1004, an input device 1005, an output device 1006, a bus 1007, and the like.

In the following description, the term "device" can be read as a circuit, a device, a unit, or the like. The hardware configuration of the dialog device 10 may be configured to include one or a plurality of illustrated devices or may be configured without including some of the devices.

Each function in the dialog device 10 is realized by loading predetermined software (a program) into hardware such as the processor 1001 or the memory 1002 so that the processor 1001 performs calculation to control communication that is performed by the communication device 1004 or reading and/or writing of data in the memory 1002 and the storage 1003.

The processor 1001, for example, operates an operating system to control the entire computer. The processor 1001 may be configured as a central processing unit (CPU) including an interface with a peripheral device, a control device, a calculation device, a register, and the like. For example, at least some of the functional elements of the dialog device 10 may be realized by the processor 1001.

Further, the processor 1001 loads a program (program code), a software module, or data from the storage 1003 and/or the communication device 1004 into the memory 1002 and executes various processes according to the program, the software module, or the data. As the program, a program for causing the computer to execute at least part of the operation described in the above embodiment may be used. For example, at least some of the functional elements of the dialog device 10 may be realized by a control program stored in the memory 1002 and operating on the processor 1001, or other functional blocks may be realized similarly. Although the case in which the various processes described above are executed by one processor 1001 has been described, the processes may be executed simultaneously or sequentially by two or more processors 1001. The processor 1001 may be implemented by one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), software modules, and the like in order to implement a wireless communication method according to the embodiment of the present invention.

The storage 1003 is a computer-readable recording medium and may be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc, a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a table including the memory 1002 and/or the storage 1003, a server, or another appropriate medium.

The communication device 1004 is hardware (a transmission and reception device) for performing communication between computers via a wired and/or wireless network and is also referred to as a network device, a network controller, a network card, or a communication module, for example. For example, at least some functional elements of the dialog device 10 may be realized by the communication device 1004.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, the respective devices such as the processor 1001 and the memory 1002 are connected by the bus 1007 for information communication. The bus 1007 may be configured as a single bus or may be configured as different buses between the devices.

Further, the computer 100 may include hardware such as a microprocessor, a digital signal processor (DSP), an application specific integrated circuit (ASIC), a programmable logic device (PLD), or a field programmable gate array (FPGA), and a part or all of each functional block may be realized by the hardware. For example, the processor 1001 may be implemented by at least one piece of the hardware.

As described above, the dialog device according to one aspect of the present invention includes an acquisition unit configured to acquire a user utterance input by a user; a plurality of generation units configured to generate a system utterance corresponding to the user utterance; and an output unit configured to output the system utterance generated by one generation unit selected from the plurality of generation units, wherein the plurality of generation units include a first generation unit having a first scenario, and a second generation unit having a second scenario different from the first scenario, and the output unit outputs a first system utterance generated by the first generation unit in response to the user utterance, in a first expression format, and outputs a second system utterance generated by the second generation unit in response to the user utterance, in a second expression format different from the first expression format, following the first system utterance.

In such an aspect, two types of system utterances of the first and second agents (generation units) having different scenarios are output for one user utterance in different expression formats. With this user interface, since a scene in which a plurality of agents with different characters continuously talk with the user is provided to the user, it is possible to artificially express a scene in which a plurality of people respond to one utterance.

In an dialog device according to another aspect, the acquisition unit may receive a user utterance from the user terminal, and the output unit may transmit a first system utterance to the user terminal, transmit instruction data for causing the user terminal to transmit a request signal, to the user terminal, and transmit a second system utterance to the user terminal in response to the reception of the request signal from the user terminal without reception of another user utterance. With a procedure such as this postback, two types of system utterances of two types of agents (generation units) can be continuously provided to the user terminal for one user utterance.

In a dialog device according to still another aspect, the output unit may transmit the instruction data to the user terminal together with the first system utterance. It is possible to shorten an overall processing time and a processing time in both the user terminal and the dialog device by providing the instruction data and the first system utterance to the user terminal in one transmission process.

In a dialog device according to still another aspect, the second generation unit may generate the second system utterance in response to the reception of the request signal. From the reception of the request signal from the user terminal, it is estimated that either the user terminal or communication between the user terminal and the dialog device is normal. By generating the second system utterance for the first time when a system environment is expected to be normal, it is possible to avoid wasting of such a generation process. For example, it is possible to prevent a situation in which the generated second system utterance cannot be provided to the user terminal.

In the dialog device according to still another aspect, the expression format may be defined as at least one of an auditory expression and a visual expression. In this case, it is possible to cause a person to experience, through hearing or vision of the person, a scene in which a plurality of people respond to one utterance.

In a dialog device according to still another aspect, the auditory expression may include at least one selected from a voice and a sound effect, and the visual expression may include at least one selected from a speech balloon, a font, a text decoration, a screen color, an icon, a character, and a chat room. With such an expression format, it is possible to easily transfer a scene, in which a plurality of people respond to one utterance, to a person through hearing or vision of the person.

In a dialog device according to still another aspect, a dialog indicated by one chat room corresponding to one generation unit may be limited to one or more user utterances, and one or more system utterances that are generated by the generation unit. By preparing a dedicated chat room for each of a plurality of generation units, it is possible to provide the user with an experience in which the chat room changes according to content of a scenario utterance.

Although the present invention has been described in detail above, it is apparent to those skilled in the art that the embodiment is not limited to the embodiment described in the present specification. The embodiment can be implemented as a modified and changed aspect without departing from the spirit and scope of the present invention defined by the description of the claims. Accordingly, the description of the present specification is intended for the purpose of illustration and does not have any restrictive meaning with respect to the embodiment.

Notification of information is not limited to the aspect and embodiment described in the present specification and may be performed using another method. For example, notification of information may be performed by physical layer signaling (for example, downlink control information (DCI) or uplink control information (UCI)), upper layer signaling (for example, radio resource control (RRC) signaling, medium access control (MAC) signaling, or annunciation information (master information block (MIB) or system information block (SIB)), another signal, or a combination of these. Further, RRC signaling may be called an RRC message, and may be, for example, an RRC connection setup message or an RRC connection reconfiguration message.

Further, each aspect/embodiment described in the present specification may be applied to long term evolution (LTE), LTE advanced (LTE-A), SUPER 3G, IMT-Advanced, 4G, 5G, future radio access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, ultra wide band (UWB), Bluetooth (registered trademark), a system using another appropriate system, and/or a next generation system extended on the basis of these systems.

A process procedure, a sequence, a flowchart, and the like in each aspect/embodiment described in the present specification may be in a different order unless inconsistency arises. For example, for the method described in the present specification, elements of various steps are presented in an exemplary order, and the elements are not limited to the presented specific order.

Information or the like can be output from an upper layer (or a lower layer) to the lower layer (or the upper layer). The information or the like may be input and output through a plurality of network nodes.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present specification may be used alone, may be used in combination, or may be used by being switched according to the execution. Further, a notification of predetermined information (for example, a notification of "being X") is not limited to being made explicitly, and may be made implicitly (for example, a notification of the predetermined information is not made).

Software should be construed widely so that the software means an instruction, an instruction set, a code, a code segment, a program code, a program, a sub-program, a software module, an application, a software application, a software package, a routine, a subroutine, an object, an executable file, a thread of execution, a procedure, a function, and the like regardless of whether the software may be called software, firmware, middleware, microcode, or hardware description language or called another name.

Further, software, instructions, and the like may be transmitted and received via a transmission medium. For example, when software is transmitted from a website, a server, or another remote source using wired technology such as a coaxial cable, an optical fiber cable, a twisted pair and a digital subscriber line (DSL) and/or wireless technology such as infrared rays, radio, and microwaves, those wired technology and/or wireless technology are included in the definition of the transmission medium.

The information, signals, and the like described in the present specification may be represented by any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or an arbitrary combination of these.

The terms described in the present specification and/or terms necessary for understanding of the present specification may be replaced by terms having the same or similar meanings.

The terms "system" and "network" used in the present specification are used interchangeably with each other.

Further, information, parameters, and the like described in the present specification may be represented by an absolute value, may be represented by a relative value from a predetermined value, or may be represented by corresponding different information. For example, radio resources may be indicated by an index.

The names used for the above-described parameters are not definitive in any way. Further, mathematical expressions and the like using those parameters are different from those explicitly disclosed in the present specification in some cases. Because various channels (for example, PUCCH and PDCCH) and information elements (for example, TPC) can be identified by every appropriate names, various names assigned to such various channels and information elements are not definitive in any way.

A user terminal and a mobile communication terminal may be called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms by a person of ordinary skill in the art.

The term "determining" used in the present specification may include a variety of operations. The "determining" can include, for example, regarding judging, calculating, computing, processing, deriving, investigating, looking up (for example, looking up in a table, a table or another data structure), or ascertaining as "determining". Further, "determining" can include, for example, regarding receiving (for example, receiving information), transmitting (for example, transmitting information), inputting, outputting, or accessing (for example, accessing data in a memory) as "determining". Further, "determining" can include regarding resolving, selecting, choosing, establishing, comparing or the like as "determining". That is, "determining" can include regarding a certain operation as "determining".

The terms "connected", "coupled", or any modification thereof means any direct or indirect connection or coupling between two or more elements, and can include the presence of one or more intermediate elements between two elements "connected" or "coupled" to each other. The coupling or connection between elements may be physical, may be logical, or may be a combination thereof. When used in the present specification, two elements can be considered to be "connected" or "coupled" to each other by using one or more wires, cables, and/or printed electrical connections, or by using electromagnetic energy such as electromagnetic energy having wavelengths in a radio frequency region, a microwave region, and a light (both visible and invisible) region as some non-limiting and non-comprehensive examples.

The description "based on" used in the present specification does not mean "based only on" unless otherwise noted. In other words, the description "based on" means both of "based only on" and "at least based on".

When terms such as "first" and "second" have been used in the present specification, any reference to elements thereof does not generally limit an amount or order of the elements. These terms can be used in the present specification as a convenient way to distinguish between two or more elements. Thus, the reference to the first and second elements does not mean that only two elements can be adopted there or that the first element has to precede the second element in some way.

As long as "include", "including" and variations thereof are used in the present specification or claims, those terms are intended to be comprehensive like the term "comprising". Further, the term "or" used in the present specification or claims is intended not to be an exclusive OR.

In the present specification, it is assumed that a plurality of devices are included unless a single device is clearly indicated by the context or technically.

REFERENCE SIGNS LIST

10: Dialog device
20: Front function
21: Scenario database
22: Acquisition unit
23: Utterance control unit
24: Generation unit
25: Output unit
30: Bot function
31: Scenario database
32: Generation unit
90: User terminal
200, 210, 220: Chat room

The invention claimed is:

1. A dialog device comprising:
    an acquisition unit configured to receive a user utterance input by a user from a user terminal;
    a plurality of generation units configured to generate a system utterance corresponding to the user utterance; and
    an output unit configured to output the system utterance generated by one generation unit selected from the plurality of generation units,
    wherein the plurality of generation units include a first generation unit having a first scenario, and a second generation unit having a second scenario different from the first scenario, and
    the output unit is configured to:
        transmit, to the user terminal, a first system utterance generated by the first generation unit in response to the user utterance, in a first expression format,
        transmit instruction data for causing the user terminal to transmit a request signal, to the user terminal, and
        in response to reception of the request signal from the user terminal without reception of another user utterance, transmit, to the user terminal, a second system utterance generated by the second generation unit in response to the user utterance, in a second expression format different from the first expression format, following the first system utterance.

2. The dialog device according to claim 1, wherein the output unit transmits the instruction data to the user terminal together with the first system utterance.

3. The dialog device according to claim 1, wherein the second generation unit generates the second system utterance in response to the reception of the request signal.

4. The dialog device according to claim 1, wherein the expression format is defined as at least one of an auditory expression and a visual expression.

5. The dialog device according to claim 4,
    wherein the auditory expression includes at least one selected from a voice and a sound effect, and
    the visual expression includes at least one selected from a speech balloon, a font, a text decoration, a screen color, an icon, a character, and a chat room.

6. The dialog device according to claim 5, wherein a dialog indicated by one chat room corresponding to one generation unit is limited to one or more user utterances and one or more system utterances generated by the generation unit.

* * * * *